United States Patent [19]
Broniewski

[11] 4,268,366
[45] May 19, 1981

[54] METHOD OF CONCENTRATING ALKALI HYDROXIDE IN THREE COMPARTMENT HYBRID CELLS

[75] Inventor: Bogdan M. Broniewski, Newport Beach, Calif.

[73] Assignee: Occidental Research Corporation, Irvine, Calif.

[21] Appl. No.: 107,688

[22] Filed: Dec. 27, 1979

Related U.S. Application Data

[63] Continuation of Ser. No. 32,151, Apr. 23, 1979, abandoned.

[51] Int. Cl.³ .............................................. C25B 1/35
[52] U.S. Cl. ...................................... 204/98; 204/128
[58] Field of Search .................................. 204/98, 128

[56] References Cited

U.S. PATENT DOCUMENTS

| | | | |
|---|---|---|---|
| 3,135,673 | 6/1964 | Tirrell et al. | 204/98 |
| 3,222,267 | 12/1965 | Tirrell et al. | 204/98 |
| 3,262,868 | 7/1966 | Juda et al. | 204/98 |
| 3,654,104 | 4/1972 | Yoshida et al. | 204/98 |
| 4,035,255 | 7/1977 | Gritzner | 204/128 |
| 4,117,809 | 9/1978 | Murayama et al. | 204/98 |

Primary Examiner—R. L. Andrews
Attorney, Agent, or Firm—Christie, Parker & Hale

[57] ABSTRACT

A flow of an alkali hydroxide solution such as chloralkali cell liquor containing NaOH and NaCl is introduced into the anode compartment of a hybrid cell which also includes a cathode compartment and a central compartment. The anode compartment is defined by a first surface of a gas diffusion type, electrode and a first surface of a gas diffusion type, electrode and a first surface of a cation permeable membrane. The central compartment is defined by a second surface of the cation permeable membrane, which membrane is opposite such first membrane surface and a first surface of a diaphragm. The cathode compartment is defined by a second surface of such diaphragm opposite such first diaphragm surface and a first surface of a gas diffusion type cathode. Gaseous hydrogen is supplied to the anode; air is supplied to the cathode, in each case at the surface opposite the aforementioned first surfaces, and water is supplied to the central compartment which is a flow communication with the cathode compartment. Anode cell liquor having, e.g., about 12% caustic content, is introduced into the anode compartment. The chloralkali cell is electrically in series with the hybrid cell. When the same number of coulombs flow through the chloralkali cell and the hybrid cell, sodium ions pass from the chloralkali cell liquor through the membrane to the central compartment and by diffusion and fluid flow to the cathode compartment. Hydroxide ion is generated by reduction of oxygen at the cathode and there is formed a purified concentrated caustic solution as product. Concentration occurs by electrolytic consumption of water and evaporation of water from the cathode.

27 Claims, 3 Drawing Figures

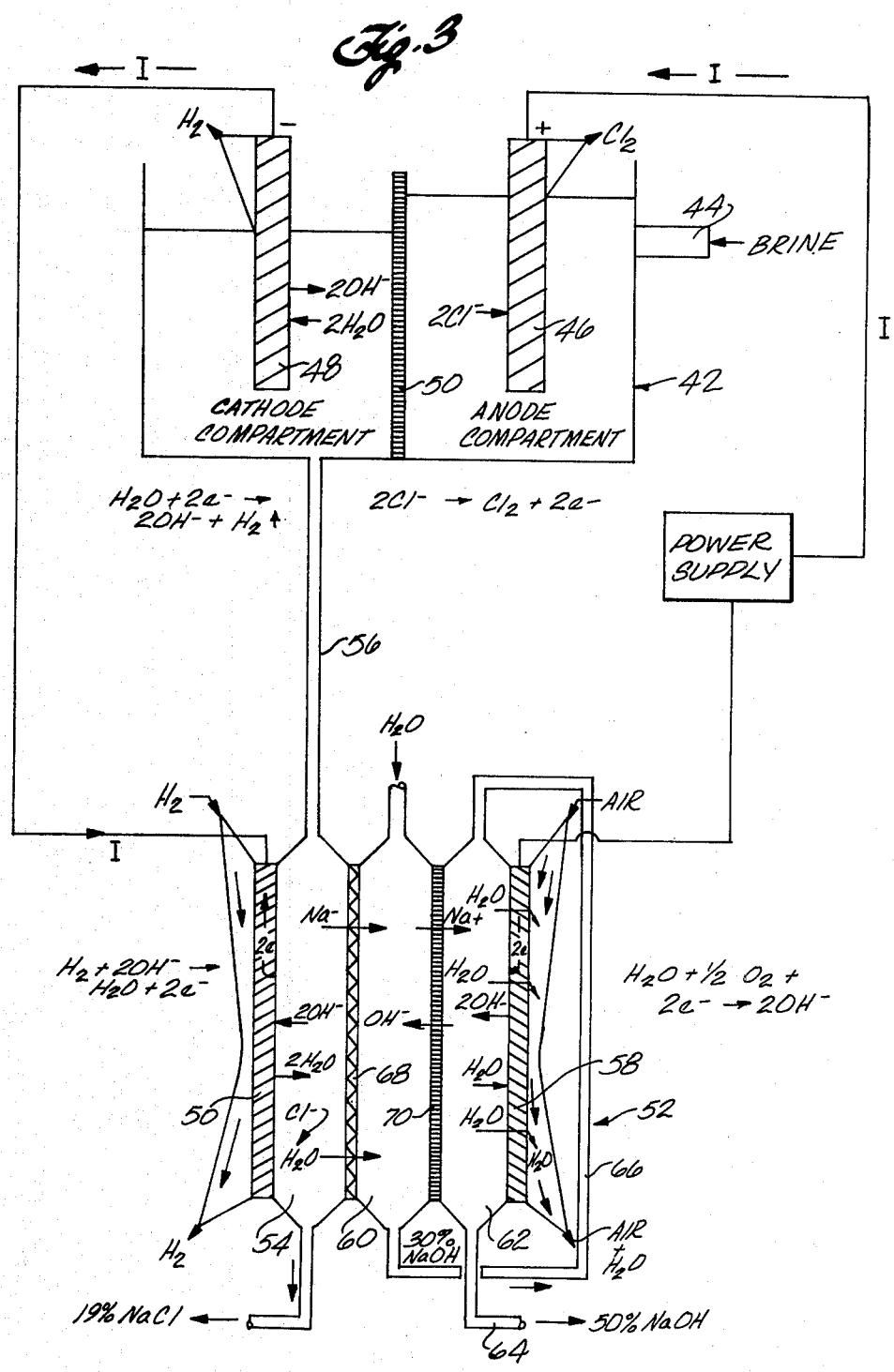

METHOD OF CONCENTRATING ALKALI HYDROXIDE IN THREE COMPARTMENT HYBRID CELLS

This is a continuation of application Ser. No. 32,151, filed Apr. 23, 1979 now abandoned.

BACKGROUND OF THE INVENTION

The present invention relates to electrochemical processes for production of chlorine and caustic from brine, and to the simultaneous production of electrical energy. More particularly, the invention is directed to the treatment of the cell liquor from a chloralkali cell to separate the sodium ions from the cell liquor and concentrate them in another liquor, to form a sodium hydroxide solution.

The production of chlorine and crude caustic solutions by electrolysis of brine is a major industry. Considerable quantities of energy are required for electrolysis of the brine to produce chlorine and subsequent treatment of the cell liquor resulting from electrolysis to obtain caustic solutions of the desired purity and concentration. A 50 weight percent aqueous caustic solution of low sodium chloride content is a commercially desired product.

Known processes for electrolysis of brine produce cathode cell liquors having a caustic content of about 10 to 15 percent by weight, occasionally as high as about 25 percent by weight, and a sodium chloride content of up to about 15 percent by weight. The cell liquor produced by a diaphragm cell typically contains about 10 percent by weight caustic (NaOH) and 15 percent by weight sodium chloride (NaCl).

In the diaphragm cell, brine is continuously fed to an anode compartment, where chlorine is produced and then flows through a diaphragm, usually made of asbestos, to a cathode compartment. Hydrogen gas is discharged from the solution at the cathode, with attendant generation of hydroxyl ions. To minimize back-migration of hydroxide ions from the cathode compartment to the anode compartment, a positive flow rate is always maintained; that is, a flow in excess of the conversion rate. As a consequence, the resulting catholyte solution, i.e., the cathode cell liquor as the term is used herein, has unconsumed sodium chloride in addition to product sodium hydroxide. The cathode cell liquor containing the sodium hydroxide and sodium chloride must be purified and concentrated to obtain a caustic solution of commercial value and yield a sodium chloride solution that can be recycled to the diaphragm cell.

A membrane cell, which employs a membrane selectively permeable to certain cations in place of a diaphragm, yields a catholyte of low salt content and having a caustic content of up to about 25 percent by weight or more. The highly corrosive caustic medium, however, is harsh on membrane materials and specifications for the membrane must be rigid. Membranes are quite complex and expensive. In addition, voltage drop within the membrane cell is relatively high which increases consumption of electricity. In sum, membrane cells are costly in regard to investment and operating costs.

Typical processes for concentrating cell liquor and separating the sodium chloride from the caustic involve evaporation and crystallization with the consumption of large amounts of steam and consequently, fuel required to generate steam. Investment in such processes is considerable.

One solution to the problem of obtaining cell liquor having high caustic concentration is described in U.S. Pat. No. 3,899,403 to Cook, Jr., et al. A three-compartment electrolytic cell produces solutions of high and low caustic concentration. A two-compartment cell then concentrates the solution of low caustic concentration. Current efficiency in the two-compartment cell is lower than that in the three-compartment cell. Overall current efficiency is about 70 percent. As both cells consume electric power, the energy cost of the process is high.

U.S. Pat. No. 4,036,717 to Babinsky et al describes a three-chamber electrolytic cell for concentrating and purifying cell liquor containing sodium or potassium hydroxide. The cell has a porous catalytic anode, a porous asbestos diaphragm between the anode chamber and a central chamber, and a cation-permselective membrane between the central chamber and the cathode chamber. Cell liquor is passed through the central chamber and concentrated caustic is withdrawn from the cathode chamber. Hydrogen gas generated by the electrolysis is supplied to the anode to decrease the potential across the cell below the evolution potential for chlorine and coincidentally reduce the power requirements for the cell.

The use of hydrogen-air fuel cells to consume hydrogen gas from chloralkali cells and to produce electricity for powering a portion of the choralkali cells is described in Canadian Pat. No. 642,449. In the process described, hydrogen formed by the electrolysis of brine in a chloralkali cell is fed to the anode of a fuel cell and air is fed to the cathode. The fuel cell employs an aqueous electrolyte of sodium or potassium hydroxide having a concentration of 5 to 50 weight percent. There is no suggestion in the patent that the cell liquor from the chloralkali cells can be purified or concentrated by using such cell liquor as the electrolyte in the fuel cell.

U.S. Pat. No. 3,511,712 to Giner describes a process for removing carbon dioxide from gas streams using a fuel cell. An alkali metal carbonate solution formed by absorption of carbon dioxide is introduced to the anode compartment of a fuel cell operating by consumption of an oxidant and a fuel to generate hydrogen ions, consume hydroxyl ions and generate electricity. Operation lowers pH of the electrolyte in the vicinity of the anode to a point where carbon dioxide is evolved with a simultaneous increase of pH. This restores the carbon dioxide absorptive capacity of the solution. The patent does not suggest the use of a fuel cell to purify and concentrate chloralkali cell liquor and, in fact, the Giner process would not be suitable for the treatment of cell liquor because the required lowering of the anolyte pH to 9 results in polarization of the anode and a severe lowering of the current efficiency of the cell.

SUMMARY OF THE INVENTION

In accordance with the present invention, there is provided a process for the simultaneous production of alkali metal hydroxide and the generation of electrical energy using a hybrid cell. The invention is particularly directed to forming a purified and concentrated caustic solution from the effluent of a chloralkali cell with attendant generation of electrical energy for use by the chloralkali cell.

In the process of the invention, an aqueous solution of at least one alkali metal hydroxide is caused to flow, as anolyte, through the anode compartment of at least one hybrid cell which anode compartment is defined by a first surface of a gas diffusion type anode spaced from a first surface of a cation permeable membrane. The hybrid cell also includes a central compartment which is defined by a second surface of the membrane, opposite such first membrane surface, and a first surface of a diaphragm; and a cathode compartment defined by a first surface of a gas diffusion type cathode and a second diaphragm surface opposite the first surface of the diaphragm. The central compartment is in flow communication with the cathode compartment. A flow of catholyte, which is an aqueous media receptive to alkali metal ions, is introduced to the central compartment.

A flow of current from the cathode through an external load to the anode is produced by electrochemical reduction of oxygen at the cathode and electrochemical oxidation of hydrogen at the anode. Under conditions of current flow, some alkali metal ions move transversely to the flow of the anolyte, through the membrane, and into the catholyte. This results in separation of some of the alkali metal ions from the anolyte passing through the path defined by the anode compartment. The separated alkali ions enter the cathode compartment by passage through the diaphragm and as a consequence of flow of catholyte from the central compartment to the cathode compartment.

Optimum performance is achieved when the geometry of the anode, central and cathode compartments are such that flow of the anolyte and catholyte are substantially in one direction from inlet to outlet without appreciable mixing, back convection, or diffusion of molecules and ions, and wherein cation flow is substantially transverse to the flow of the anolyte.

Concentration of the alkali metal hydroxide in the catholyte occurs as a consequence of cation transfer, electrolytic consumption of water at the cathode to form hydroxyl ions, and evaporation of water through the cathode into air. Air, the most economical supply of oxygen, is passed over the cathode surface opposite to the surface in contact with the catholyte, i.e., the second cathode surface.

In sum, separation of alkali metal ions from the solution introduced to the anode compartment occurs first, while concentration occurs by electrolytic consumption of water and evaporation of water.

The net result of the process is to cause the aqueous solution of alkali metal hydroxide, as it passes through the anode compartment, to be continuously depleted of alkali metal ions, resulting in an alkali metal ion concentration gradient existing between the inlet and outlet of the anode compartment. As a consequence of acceptance of alkali metal ions by the catholyte passing through the central and the cathode compartments and generation of hydroxide ions by reduction of oxygen, the aqueous media becomes more concentrated in alkali metal hydroxide as it progresses through the central and cathode compartments. It leaves as a solution more concentrated in alkali metal hydroxide than the aqueous media introduced to the central compartment.

The present invention, in its preferred application, is for the treatment of a chloralkali cell liquor to produce a purified and concentrated aqueous caustic solution. In this application, chloralkali cell liquor containing sodium hydroxide and sodium chloride is introduced into the anode compartment of a three-compartment hybrid cell which preferably employs thin compartments. The gas diffusion type anode of the hybrid cell is contacted with hydrogen generated by the chloralkali cell at the surface opposite such first surface, i.e. the second anode surface. The hydrogen is oxidized at the anode. The anode is separated from the central compartment by a membrane selectively permeable to cations. A diaphragm is interposed between the membrane and a gas diffusion type cathode which is in contact with a flow of air. The central compartment is also in flow communication with the cathode compartment. An aqueous medium, typically water or a dilute solution of at least one alkali metal hydroxide, is introduced into the central compartment and flows through the central compartment to the cathode compartment and from the cathode compartment to an outlet.

Although the electrical energy generated as a consequence of the electrochemical oxidation and reduction reactions which occur in the hybrid cell may be fed to any load, it is advantageous to couple one or more hybrid cells in series with the chloralkali cell to provide part of the electrical energy required to operate the chloralkali cell. When the same number of coulombs flow between the chloralkali cell and the hybrid cell, sodium ions from the introduced chloralkali cell liquor pass transversely to the flow of the anolyte chloralkali cell liquor in the anode compartment, through the membrane and into the aqueous medium flowing in the central compartment. Sodium ions enter the cathode compartment as part of the aqueous medium flowing from central compartment to the cathode compartment and by passage through the diaphragm. Hydroxyl ions generated as a consequence of reduction of oxygen at the cathode combine with with the transferred sodium ions to form sodium hydroxide. Consumption of water by generation of hydroxyl ions also serves to concentrate the sodium hydroxide solution being formed in the central and cathode compartments. Additional concentration occurs by evaporation of water through the cathode into air passing over the surface of the cathode opposite the surface in contact with the catholyte. Water evaporation also serves to cool the hybrid cell.

THE DRAWINGS

The invention may be more clearly understood by reference to the drawings, wherein:

FIG. 3 is a flow diagram showing a chloralkali cell and a hybrid cell being operated in combination.

DETAILED DESCRIPTION

Alkali metal hydroxide solutions of any concentration can be treated in accordance with this invention. For efficiency, the solution preferably has, for instance, an alkali metal concentration between about 5 and 30 weight percent, calculated as alkali metal hydroxide. Typically, the solution is a chloralkali cell liquor, comprising between about 10 and 25 weight percent sodium hydroxide and up to about 15 percent by weight sodium chloride. Solutions of other alkali metal hydroxides, such as potassium hydroxide and lithium hydroxide, can also be treated. The solution can also contain sodium iodide and potassium bromide and the like. The invention is adaptive to treating liquors from chloralkali cells, including diaphragm and membrane cells, mercury cells and the like. Methods of operating such cells; and the cell liquor produced therein are well known to those skilled in the art and have been described in an extensive body of technical publications and patents. Accordingly, this description will be directed primarily to the operation of the hybrid cells alone and in combination with chloralkali cells.

Figure 1:
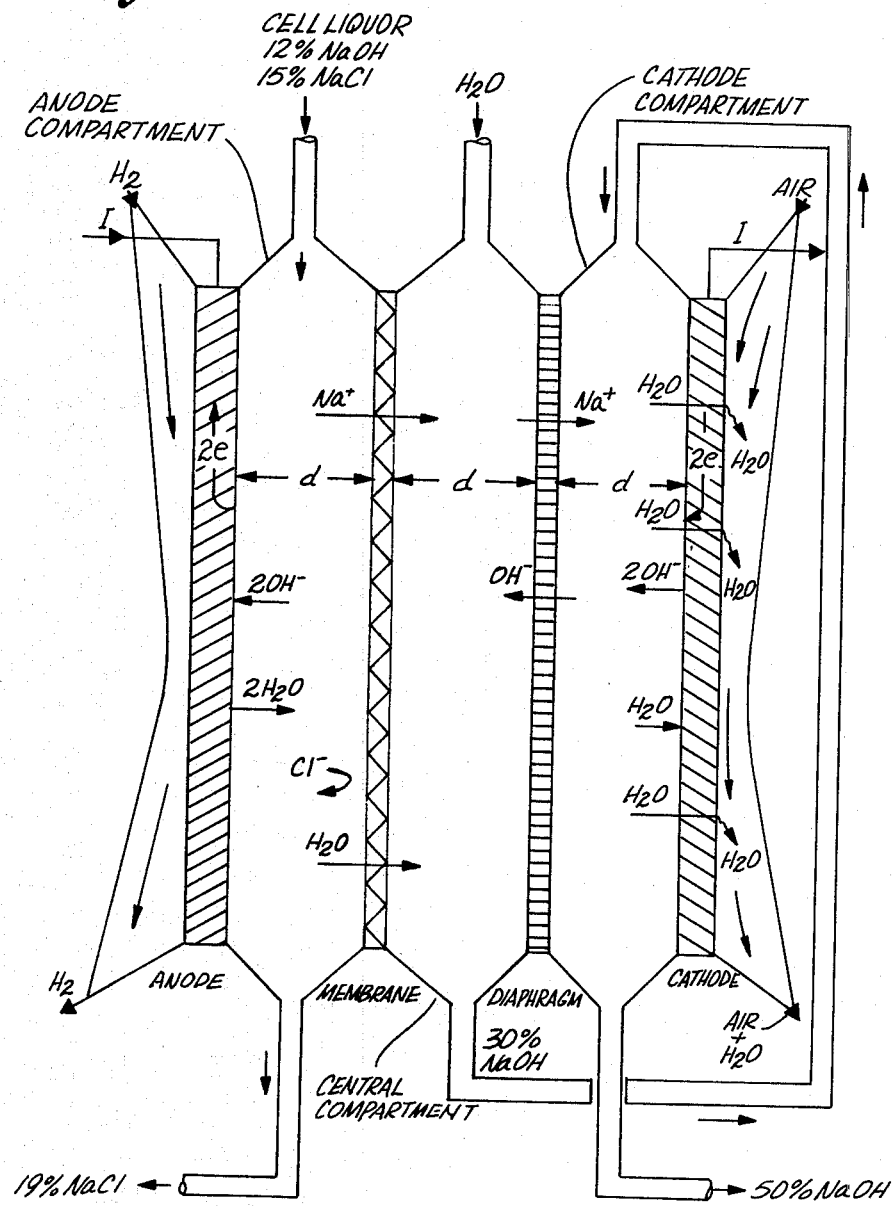
FIG. 1 is a schematic illustration of a hybrid cell used in practice of this invention.

FIG. 1 schematically depicts the operation of a hybrid cell of this invention. A typical chloralkali cell liquor, containing 12 weight percent NaOH and 15 weight percent NaCl is introduced as anolyte into the anode compartment of the hybrid cell. The compartments of the hybrid cell are designed to provide flow substantially in one direction from inlet to outlet without appreciable mixing, back convection or diffusion of molecules and ions. This may be achieved when the average distance (d) between the anode and membrane, membrane and diaphragm, and diaphragm and cathode are respectively about 1 mm or less, typically about 0.1 mm to about 1 mm.

The cell liquor contacts a gas diffusion type anode. Hydrogen gas from any source and preferably from a chloralkali cell contacts the opposite side of the anode. The anode thus provides a surface for intimate contact between the hydrogen gas and the anolyte.

Hydrogen undergoes an oxidation reaction which may be schematically represented as:

$$H_2 + 2OH^- \rightarrow 2H_2O + 2e^-$$

As the anolyte flows through the anode compartment, its hydroxide content is progressively reduced and its water content progressively increased.

Separating the anode compartment from the central compartment is a cation-permselective membrane, that is a membrane which is permeable to cations such as the sodium ion, but is relatively impermeable to anions such as the chloride ions. To maintain a chemical balance and to account for depletion of hydroxide ions from the anolyte, sodium ions under condition of current flow through an external load separate from the anolyte and pass through the cation-permselective membrane into the central compartment of the hybrid cell. Substantially all of the chloride ions remain in the anolyte, along with sufficient sodium ions to electrically balance the chloride ions.

The central compartment of the fuel cell is separated from the anode compartment by a cation-permselective membrane and is separated from the cathode compartment by a barrier which is permeable both to anions and cations, such as a semi-permeable asbestos diaphragm. An aqueous medium such as water or a dilute ionic solution, which may be part of the solution drawn from the anode compartment, is introduced into the central compartment, and progressively picks up sodium ions moving through the cation-permselective membrane. The catholyte contacts a gas diffusion type cathode where oxygen is reduced by the schematic equation:

$$H_2O + \tfrac{1}{2}O_2 + 2e^- \rightarrow 2OH^-$$

preferably as a consequence of the passage of air over the cathode. Some of the hydroxide ions pass from the cathode compartment to the central compartment. The net effect is that the sodium hydroxide content of the catholyte increases as it flows through the central compartment.

A catholyte now of intermediate sodium hydroxide concentration is withdrawn from the central compartment and introduced into the cathode compartment of the hybrid cell. A proportion of the sodium ions entering the central compartment through the cation-permselective membrane continue on through the ion permeable barrier or diaphragm into the cathode compartment. When sodium hydroxide solution from the central compartment is introduced into the cathode compartment, the sodium ions which pass through the ion permeable barrier accumulate in the catholyte contacting the gas diffusion type cathode. Oxygen from the air is reduced, forming hydroxide ions to balance the sodium ions and consume water of the catholyte; thus partially concentrating the sodium hydroxide solution.

Contemporaneously, water from the catholyte evaporates at the surface of the cathode into the air stream, and a stream of moist air is removed from contact with the cathode. For a given cathode surface area, the flow of air may be regulated to provide sufficient evaporation of water from the surface of the cathode to further concentrate sodium hydroxide in the catholyte. In practice, the rate of addition of water to the central compartment, the rate of transportation of water through the cation-permselective membrane and into the central compartment, the rate of water consumption at the cathode and the rate of evaporation of water from the cathode, are all correlated so as to provide a product catholyte of desired caustic concentration.

Thus, when the cell liquor, the water introduced to the central compartment and the catholyte all flow through their respective compartments cocurrently, as shown in FIG. 1, the sodium hydroxide concentration of the anolyte decreases from about 12% at the inlet and approaches 0% at the outlet. The sodium hydroxide concentration of the catholyte, by contrast, increases from about 0% at the inlet to about 50% at the outlet. Such concentration differences are achievable with currently available membranes and diaphragms.

As indicated, the anolyte withdrawn from the anode compartment can be substantially depleted of sodium hydroxide content. However, even when the effluent from the anode compartment contains as little as 0.01 weight percent or 0.1 weight percent of sodium hydroxide, the pH of the effluent is high, i.e., about 12. The high pH of the effluent from the anode compartment is advantageous in that polarization and loss of current efficiency which can be associated with a change from an alkaline to a neutral or acid pH is avoided.

The process and hybrid cell illustrated in FIG. 1 can, of course, be used to treat cell liquors having differing concentrations of alkali metal hydroxide and alkali metal halide. By regulating the flow of water or dilute aqueous alkali metal hydroxide into the central compartment and the evaporation of water from the cathode, the concentration of the product flowing from the cathode compartment can be varied over a wide range. Thus, any desired concentration of alkali metal hydroxide up to the point of solubility in water can be achieved at will. The extent of separations of anions is, however, limited by the concentration gradient across the cell; and as higher concentrations of alkali metal hydroxide are sought, some diffusion of halide can occur. This only affects product catholyte purity.

The hybrid cell can be arranged in a filter press type structure with a multitude of elementary hybrid cells connected in series to form a net unit hybrid cell.

Figure 2:
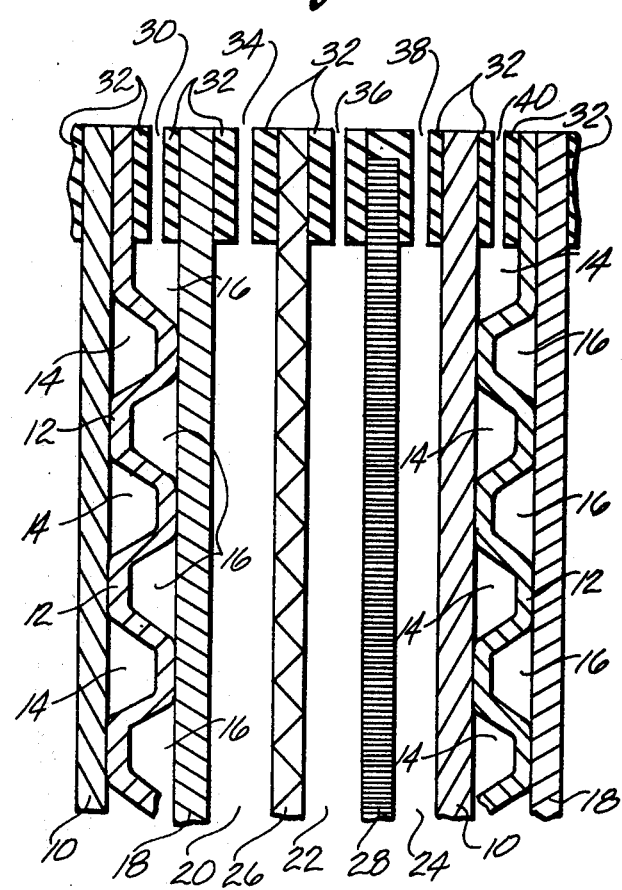
FIG. 2 is a partial cross-sectional view of a hybrid cell having a plurality of thin cell units.

FIG. 2 is a partial cross-sectional view of a portion of a filter press type of hybrid cell unit showing the sequence and arrangement of elements in the cell. There is provided gas diffusion type cathodes 10 and electrically conductive gas separator and current collectors 12 which helps to define air channels 14 and hydrogen channels 16; gas diffusion type anodes 18; an anolyte compartment 20; central compartment 22; a catholyte compartment 24; membrane 26 and diaphram 28. The following conduits are formed by insulating ported spacers 32. Conduit 20 which serves hydrogen channels 16. Conduit 34 which is for the liquor to be processed; conduit 36 for water; conduit 38 is for fluid flow to cathode compartment 24; while conduit 40 is for feed of air to channels 14.

Given the sequence of elements, such variables as the thickness and spacing of elements, the shape of the air and hydrogen channels are subject to wide variation. In addition, many different materials of construction may be employed, because the process of this invention is practiced under relatively mild conditions, particularly when compared with the highly oxidative and corrosive conditions found in a chloralkali cell. Thus, any material stable to alkali hydroxide and cell operating temperature may be used.

Materials of construction and cell construction arrangements are described, for instance, in U.S. Pat. Nos. 3,098,762; 3,196,048; 3,296,025; 3,511,712, 3,516,866; 3,530,003; 3,764,391; 3,899,403; 3,091,731; 3,957,535; 4,036,717 and 4,051,002 and British Patent Specifications 1,211,593 and 1,212,387, each incorporated herein by reference.

The cation permselective membranes may be solid aliphatic or aromatic sulfonates; phenolics; copolymers of ethylenically unsaturated monomers such as ethylene or propylene with ethylenically unsaturated carboxylic acids or salts thereof, and the like.

Whatever the selected material, the membrane preferably will have a permselectivity in 40% NaOH of at least about 0.95, an ohmic resistance not more than about 3 ohm-cm and an electrosomotic coefficient of not more than about 74 gms of water per Faraday.

The gas diffusion anodes and cathodes employed in the construction of the hybrid cells are hydrophilic and may vary widely. They generally consist of a gas diffusion barrier layer providing a catalytic surface. The gas diffusion layer may be catalytic per se or catalytic properties induced or promoted by a noble metal and the like. A suitable gas diffusion type cathode and/or anode may be formed of activated carbon which may be promoted by a noble metal and combined with a support material such as Teflon TM.

The porous diaphragms can be made of fuel cell grade asbestos films, porous rubber battery separators, porous nickel sheets, or ion exchange membranes which are permeable to both anions and cations.

It is contemplated that the catholyte can be transferred from a central compartment of the hybrid cell to the cathode compartment in either or both of two ways. First, the catholyte can be withdrawn from an outlet of the central compartment and introduced into an inlet of the cathode compartment. Second, by establishing a pressure differential across a porous diaphragm, the catholyte from the central compartment can be made to flow through the diaphragm into the cathode compartment. Both means of transferring catholyte from the central compartment to the cathode compartment can be employed simultaneously. Liquid permeable polymeric films and woven or non-woven fabrics may also be used as materials of construction for the porous diaphragm.

The hybrid cell can be operated at any temperature which maintains the electrolytes in a liquid state and avoids the precipitation of dissolved constituents such as alkali metal halide or alkali metal hydroxide. Temperatures of from about 20° C. to 100° C., more preferably 40° C. to 70° C., may be employed. Because the cell liquor from a chloralkali cell is warm and because heat is generated within the fuel cell during its operation, it is necessary to cool the cell to maintain a desired operating temperature. The cell is conveniently cooled as an incidence of evaporation of water from the catholyte through the gas diffusion type cathode into the stream of air which is passed across the surface of the cathode opposite the aforesaid first surface of such gas diffusion type cathode to supply oxygen to the cathode. In a filter press type of hybrid cell unit, the individual cells are so thin that there is excellent heat transfer between the anode, cathode, and fluid compartments.

To achieve effective cooling through the cathode by evaporation, it may be desirable to continuously introduce fresh, dry air into the hybrid cell at a point removed from the air intake which supplies the hybrid cells. Air can be dried conveniently by passing it over cooling coils or through dessicant such as silica gel in accordance with known methods. The flow of electrolytes through the compartments of the fuel cell can be cocurrent as shown in FIG. 1 or countercurrent. Cocurrent flow is preferred.

Air is the lowest cost source of the oxygen required for the cathode and serves to carry off evaporated water. Other oxygen containing gases as well as oxygen enriched air can also be used, but at greater expense.

FIG. 3 shows the inter-relationship between chloralkali cells and fuel cells used to treat the cell liquor from the chloralkali cells in accordance with this invention. Brine is introduced to the chloralkali cell 42 by line 44. Chlorine is generated at anode 46 and hydrogen released at cathode 48. Diaphragm 50 separates the compartments. Hydrogen generated in the chloralkali cell is supplied to anode 50 of the cell 52 and cell liquor fed to anode compartment 54 by line 56. Air is supplied to gas diffusion cathode 58 and water to central compartment 60. With current flow as induced by reduction of oxygen at the cathode and oxidation of the hydrogen at the anode, sodium ions pass through the membrane to the central and cathode compartments. Catholyte is drawn from compartment 62 by line 64. Line 66 connects the central compartment with the cathode compartment. The membrane is shown as 68 and the diaphragm as 70. The hybrid cell is in series with the chloralkali cell and a portion of the current required by the chloralkali cell may be provided by the hybrid cell. Thus, while additional electric current from an outside source is required to operate the chloralkali cell and is shown as "power supply", the external energy required to operate the chloralkali cell is reduced.

In a typical operation a cell liquor containing about 12 percent by weight NaOH and 15 percent by weight NaCl is supplied to anode compartment 54. Water is introduced to central compartment 60. The products withdrawn are a 19 percent by weight NaCl solution from anode compartment 54 and a purified, substantially chlorine-free, 50 percent by weight NaOH solution withdrawn from cathode compartment 62.

Although the hybrid cell may be operated in such a manner as to remove substantially all of the alkali metal hydroxide from the cell liquor, as indicated, it can be more efficient to operate the cell so as to leave a small proportion of the sodium hydroxide in the effluent from the anode compartment. When this is done, the current efficiency of the hybrid cell can be kept high to maximize the yield of useable electric current produced by the cell.

The effluent from the anode compartment of the hybrid cell can contain from about 3% to about 5% alkali metal and can be fed to the anode compartment of another hybrid cell operated under conditions which are effective for removing the last few percent of the alkali metal from the anolyte. The conditions in such a finishing cell can be regulated to produce concentrated alkali metal hydroxide product even though the feed to the anode compartment is relatively dilute. However, because the concentration of alkali metal hydroxide from such a dilute feed is accomplished at lower current efficiency than the concentration from more concentrated feed, the cell produces little or no useable current. In the latter case, the cell can be run essentially under short circuited conditions which are effective for concentrating the alkali metal hydroxide but produces no useable current. In such a cell, all of the electrical current produced by oxidation of hydrogen in the cell is consumed in accomplishing the separation and concentration of the caustic from the dilute feed. However, because the bulk of the separation was accomplished in the main hybrid cells under conditions providing higher current efficiency, the overall efficiency of the process is not seriously diminished.

Although the present invention has been described with reference to particular details and embodiments thereof, these details are intended to illustrate the invention, the scope of which is defined in the following claims.

What is claimed is:

1. A process for the production of alkali metal hydroxide and electrical energy which comprises:
   (a) introducing flow of an aqueous solution of at least one alkali metal hydroxide as anolyte to an anode compartment of at least one hybrid cell, the hybrid cell comprising a gas diffusion type anode having first and second surfaces, a membrane selectively permeable to cations and having first and second surfaces, a diaphragm permeable to cations and anions and having first and second surfaces, and a gas diffusion type cathode having first and second surfaces, the first surface of said anode and the first surface of said membrane defining said anode compartment, a central compartment defined by the second surface of said membrane, opposite said first membrane surface, and the first surface of said diaphragm, and a cathode compartment defined by the first surface of said gas diffusion type cathode and the second surface of said diaphragm, opposite said first diaphragm surface; the anode, central and cathode compartments each having an inlet and an outlet, said anolyte flowing from the inlet to the outlet of said anode compartment, the outlet of said central compartment being in flow communication with the inlet of said cathode compartment;
   (b) introducing flow of an aqueous fluid medium receptive to alkali metal ions as catholyte into the inlet of said central compartment;
   (c) withdrawing flow of the catholyte from said central compartment outlet;
   (d) introducing flow of the catholyte withdrawn from the central compartment into the inlet of the cathode compartment;
   (e) passing a flow of current through an external load between said gas diffusion type cathode and said gas diffusion type anode, said current generated by oxidation of hydrogen supplied to the second surface of said gas diffusion type anode and generation of hydroxide ion by reduction of an oxygen-containing gas supplied to the second surface of said gas diffusion type cathode, said current flow causing said alkali metal ions to selectively pass from the flowing anolyte through said membrane to the catholyte flowing through said central and cathode compartments to form a catholyte more concentrated in alkali metal hydroxide solution than the aqueous fluid medium introduced to said central compartment;
   (f) withdrawing catholyte from the outlet of said cathode compartment; and
   (g) withdrawing from the outlet of said anode compartment anolyte depleted in alkali metal ions.

2. A process as claimed in claim 1 in which the catholyte withdrawn from said cathode compartment contains alkali metal hydroxide in an amount up to about 50 percent by weight.

3. A process as claimed in claim 2 in which the aqueous solution of at least one alkali metal hydroxide introduced to said anode compartment is a solution comprising up to about 25 percent by weight sodium hydroxide.

4. A process as claimed in claim 3 in which the catholyte received from the cathode compartment contains sodium hydroxide in a concentration up to about 50 percent by weight.

5. A process as claimed in claim 1 in which the aqueous solution of alkali metal hydroxide introduced to said anode compartment is a solution comprising up to about 25 percent by weight alkali hydroxide.

6. A process as claimed in claim 5 in which the anolyte withdrawn from said anode compartment contains alkali hydroxide in a concentration above about 0.01 percent by weight.

7. A process as claimed in claim 1 in which air is caused to flow across a second surface of the gas diffusion type cathode opposite said first surface in a quantity sufficient to remove water from the surface of the gas diffusion type cathode to concentrate the alkali metal hydroxide in the catholyte flowing therethrough.

8. A process as claimed in claim 1 in which the flow of fluid in said anode, and central and cathode compartments are cocurrent.

9. A process as claimed in claim 1 in which the flow of fluid in said anode and central compartments are cocurrent, and flow in said cathode compartment is countercurrent to the flow of fluid in said central compartment.

10. A process as claimed in claim 1 in which the oxygen-containing gas is air.

11. A process as claimed in claim 1 in which the flow of anolyte from the inlet to the outlet of the anode compartment or the flow of catholyte from the inlet to the outlet of a compartment is substantially in one direction without appreciable mixing or back convection of said anolyte or catholyte.

12. A process for the production of sodium hydroxide from the aqueous effluent of a cathode compartment of a chloralkali cell and electrical energy which comprises:
   (a) introducing flow of the aqueous effluent solution of at least one chloralkali cell comprising sodium hydroxide and sodium chloride as anolyte to an anode compartment of at least one hybrid cell, the hybrid cell comprising a gas diffusion type anode having first and second surfaces, a membrane selectively permeable to sodium ions and having first and second surfaces, a diaphragm permeable to cations and anions and having first and second surfaces, and a gas diffusion type cathode having first and second surfaces, the first surface of said anode and the first surface of said membrane defining said anode compartment, a central compartment defined by the second surface of said membrane, opposite said first membrane surface, and the first surface of said diaphragm, and a cathode compartment defined by the first surface of said gas diffusion type cathode and the second surface of said diaphragm, opposite said first diaphragm surface; the anode, central and cathode compartments each having an inlet and an outlet, said anolyte flowing from the inlet to the outlet of said anode compartment, the outlet of said central compartment being in flow communication with the inlet of said cathode compartment;

(b) introducing flow of an aqueous fluid medium receptive to alkali metal ions as catholyte into the inlet of said central compartment;

(c) withdrawing flow of the catholyte from said central compartment outlet;

(d) introducing flow of the catholyte withdrawn from the central compartment into the inlet of the cathode compartment;

(e) supplying an oxygen-containing gas to the second surface of said gas diffusion type cathode opposite to the first surface thereof and hydrogen to the second surface of said gas diffusion type anode opposite to the first surface thereof;

(f) passing a flow of current through said chloralkali cell from said gas diffusion type cathode to said gas diffusion type anode of the hybrid cell, said current produced by oxidation of hydrogen at said gas diffusion type anode and generation of hydroxide ion by reduction of oxygen at said gas diffusion type cathode, said current flow causing sodium ions to selectively pass from the anolyte through said membrane to the catholyte flowing through said central and cathode compartments to form an aqueous solution of sodium hydroxide;

(g) withdrawing catholyte from the outlet of said cathode compartment which is more concentrated in respect to sodium hydroxide than the catholyte introduced to said central compartment; and (h) removing from the outlet of said anode compartment an anolyte depleted in sodium ions.

13. A process as claimed in claim 10 in which the aqueous effluent solution of the chloralkali cell introduced to said anode compartment is a solution comprising up to about 25 percent by weight sodium hydroxide and up to about 15 percent by weight sodium chloride.

14. A process as claimed in claim 13 in which the solution withdrawn from said anode compartment contains sodium hydroxide in concentration above about 0.01 percent by weight.

15. A process as claimed in claim 13 in which the solution exiting the cathode compartment contains sodium hydroxide in a concentration up to about 50 percent by weight.

16. A process as claimed in claim 10 in which the aqueous effluent solution of the chloralkali cell introduced to said anode compartment comprises from about 10 to about 15 weight percent sodium hydroxide and up to about 15 weight percent sodium chloride.

17. A process as claimed in claim 16 in which the solution withdrawn from said anode compartment contains sodium hydroxide in concentration above about 0.01 percent by weight.

18. A process as claimed in claim 16 in which the solution exiting the cathode compartment contains sodium hydroxide in a concentration up to about 50 percent by weight.

19. A process as claimed in claim 12 in which air is caused to flow across the second surface of the gas diffusion type cathode opposed to said first surface in a quantity sufficient to remove water from the surface of the gas diffusion type cathode to concentrate the sodium hydroxide flowing through the cathode compartment.

20. A process as claimed in claim 12 in which the solution exiting the cathode compartment contains sodium hydroxide in a concentration up to about 50 percent by weight.

21. A process as claimed in claim 16 in which the flow of fluid in said anode, and central and cathode compartments are cocurrent.

22. A process as claimed in claim 12 in which the flow of fluid to said anode and central compartments are cocurrent and the flow of said cathode compartment is concurrent to the flow of fluid in said central compartment.

23. A process as claimed in claim 12 in which the hydrogen is provided by the chloralkali cell.

24. A process as claimed in claim 12 in which the oxygen-containing gas is air.

25. A process as claimed in claim 10 in which the flow of anolyte from the inlet to the outlet of the anode compartment or the flow of catholyte from the inlet to the outlet of a compartment is substantially in one direction without appreciable mixing or back convection of said anolyte or catholyte.

26. A process for preparing a concentrated aqueous solution of sodium hydroxide, which is substantially free of sodium chloride, from the aqueous effluent solution of the cathode compartment of a chloralkali cell, the effluent solution comprising up to about 25 weight percent sodium hydroxide and up to about 15 weight percent sodium chloride, and simultaneously producing electrical energy, which comprises:

(a) introducing said effluent solution as anolyte flow to an anode compartment of a hybrid cell, the hybrid cell comprising a gas diffusion type anode having first and second surfaces, a membrane selectively permeable to sodium ions and having first and second surfaces, a diaphragm permeable to cations and anions and having first and second surfaces, and a gas diffusion type cathode having first and second surfaces, the first surface of said anode and the first surface of said membrane defining said anode compartment, a central compartment defined by the second surface of said membrane, opposite said first membrane surface, and the first surface of said diaphragm, and a cathode compartment defined by the first surface of said gas diffusion type cathode and the second surface of said diaphragm, opposite said first diaphragm surface;

the anode, central and cathode compartments each having an inlet and an outlet, said anolyte flowing from the inlet to the outlet of said anode compartment, the outlet of said central compartment being in flow communication with the inlet of said cathode compartment;

(b) introducing flow of an aqueous fluid medium receptive to alkali metal ions as catholyte into the inlet of said central compartment;

(c) withdrawing flow of the catholyte from said central compartment outlet;

(d) introducing flow of the catholyte withdrawn from the central compartment into the inlet of the cathode compartment;

(e) supplying air to the second surface of said gas diffusion type cathode opposite to the first surface thereof and supplying hydrogen to the second surface of said gas diffusion type anode opposite to the first surface thereof;

(f) passing a flow of current through said chloralkali cell from said gas diffusion type cathode to said gas diffusion type anode of the hybrid cell, said current produced by oxidation of hydrogen at said gas diffusion type anode and generation of hydroxide ion by reduction of oxygen at said gas diffusion type cathode, said current flow causing sodium ions to selectively pass from the anolyte through said membrane to the catholyte flowing through said central and cathode compartments to form an aqueous solution of sodium hydroxide;

(g) withdrawing catholyte, from the outlet of said cathode compartment, which contains sodium hydroxide in a concentration up to about 50 percent by weight; and (h) removing, from the outlet of said anode compartment, an anolyte depleted in sodium ions.

27. A process as claimed in claim 26 in which the flow of anolyte from the inlet to the outlet of the anode compartment or the flow of catholyte from the inlet to the outlet of a compartment is substantially in one direction without appreciable mixing or back convection of said anolyte or catholyte.

* * * * *